(12) United States Patent
Ladouceur

(10) Patent No.: US 7,338,245 B2
(45) Date of Patent: Mar. 4, 2008

(54) SELF-ATTACHING NUT

(75) Inventor: Harold A. Ladouceur, Livonia, MI (US)

(73) Assignee: Whitesell International Corp., Taylor, MI (US)

( * ) Notice: Subject to any disclaimer, the term of this patent is extended or adjusted under 35 U.S.C. 154(b) by 257 days.

(21) Appl. No.: 11/149,419

(22) Filed: Jun. 9, 2005

(65) Prior Publication Data

US 2005/0226702 A1   Oct. 13, 2005

Related U.S. Application Data

(63) Continuation-in-part of application No. 10/811,658, filed on Mar. 29, 2004, now Pat. No. 6,997,659.

(51) Int. Cl.
F16B 37/00 (2006.01)
(52) U.S. Cl. ............... 411/427; 411/181; 411/170; 411/187; 411/85; 29/525.11; 29/432.1
(58) Field of Classification Search ............ 411/85, 411/179–181, 427, 187; 29/525.11, 525, 29/432.1, 432
See application file for complete search history.

(56) References Cited

U.S. PATENT DOCUMENTS

| | | | |
|---|---|---|---|
| 2,944,642 A | | 7/1960 | Evans |
| 3,089,360 A | | 5/1963 | Steward |
| 3,091,843 A | | 6/1963 | Double et al. |
| 3,152,628 A | | 10/1964 | Strain et al. |
| 3,213,914 A | | 10/1965 | Baumle et al. |
| 3,253,631 A | | 5/1966 | Reusser |
| 3,282,315 A | * | 11/1966 | Zahodiakin ............ 411/179 |
| 3,299,500 A | * | 1/1967 | Double .................... 29/432.2 |
| 3,648,747 A | | 3/1972 | Steward |
| 3,724,520 A | * | 4/1973 | Ladouceur et al. ......... 411/179 |
| 3,810,291 A | * | 5/1974 | Ladouceur ............ 29/243.517 |
| 3,845,860 A | | 11/1974 | Ladouceur et al. |
| 3,926,236 A | * | 12/1975 | Pouch et al. ................. 411/179 |
| 4,119,827 A | | 10/1978 | Lenox |
| 4,484,385 A | | 11/1984 | Woods |
| 4,555,838 A | * | 12/1985 | Muller ..................... 29/432.1 |
| 4,633,560 A | * | 1/1987 | Muller ........................ 29/798 |
| 4,915,558 A | * | 4/1990 | Muller ....................... 411/179 |
| 4,971,499 A | * | 11/1990 | Ladouceur ................. 411/179 |
| 5,092,724 A | * | 3/1992 | Muller ....................... 411/179 |
| 5,340,251 A | * | 8/1994 | Takahashi et al. .......... 411/179 |
| 5,502,888 A | * | 4/1996 | Takahashi et al. ............ 29/798 |
| 5,528,812 A | * | 6/1996 | Muller ..................... 29/432.2 |

(Continued)

FOREIGN PATENT DOCUMENTS

EP   0 561 715 B1   9/1993

(Continued)

*Primary Examiner*—Katherine Mitchell
(74) *Attorney, Agent, or Firm*—Howard & Howard Attorneys, P.C.

(57) ABSTRACT

A self-attaching nut for installation in a panel by a plunger driven against the bottom face of the nut, the bottom face of the nut including parallel rails on opposed sides of a channel-shaped recess and a threaded bore through the recess, eliminating the requirement for a countersink in the bore at the bottom face and preventing tapping burrs from being driven back into the bore during installation.

20 Claims, 2 Drawing Sheets

U.S. PATENT DOCUMENTS

| | | | |
|---|---|---|---|
| 5,549,430 A | | 8/1996 | Takahashi et al. |
| 5,613,815 A | * | 3/1997 | Muller ................ 411/181 |
| 5,618,237 A | * | 4/1997 | Shinjo ................ 470/91 |
| RE35,619 E | * | 10/1997 | Muller ................ 29/716 |
| 5,673,472 A | * | 10/1997 | Muller ................ 29/432.1 |
| 5,882,159 A | | 3/1999 | Muller |
| 6,125,524 A | * | 10/2000 | Mueller ................ 29/520 |
| 6,257,814 B1 | * | 7/2001 | Muller ................ 411/176 |
| 6,276,040 B1 | * | 8/2001 | Muller ................ 29/432.2 |
| 2003/0039530 A1 | | 2/2003 | Ross et al. |
| 2004/0042871 A1 | * | 3/2004 | Wojciechowski et al. ... 411/181 |
| 2004/0042872 A1 | * | 3/2004 | Ward et al. ................ 411/181 |
| 2004/0076489 A1 | * | 4/2004 | Ladouceur ................ 411/181 |
| 2004/0086355 A1 | * | 5/2004 | Couillais et al. ............ 411/181 |
| 2004/0146376 A1 | * | 7/2004 | Ward et al. ................ 411/181 |
| 2004/0202524 A1 | * | 10/2004 | Ross et al. ................ 411/181 |
| 2005/0013679 A1 | * | 1/2005 | Ladoucer et al. ........... 411/180 |
| 2005/0158141 A1 | * | 7/2005 | Shinjo ................ 411/180 |

FOREIGN PATENT DOCUMENTS

EP        669473 A1 * 8/1995

* cited by examiner

SELF-ATTACHING NUT

RELATED APPLICATIONS

This application is a continuation-in-part application of Ser. No. 10/811,658 filed Mar. 29, 2004, now U.S. Pat. No. 6,997,659.

FIELD OF THE INVENTION

This invention relates to self-attaching nuts, including pierce and clinch nuts, wherein the self-attaching nuts are installed in a panel by a plunger driven against a bottom face of the nut.

BACKGROUND OF THE INVENTION

Pierce and clinch nuts were first invented by the predecessor in interest of the assignee of this application over 50 years ago as shown, for example, by U.S. Pat. Nos. 3,089,360, 3,091,843 and 3,152,628. As shown in such patents, the original pierce and clinch nuts were T-shaped in cross-section including a projecting pilot portion having a threaded bore and integral flange portions on opposed sides of the pilot portion. Where the fastener is utilized as a pierce nut, the top face of the pilot portion is driven by a plunger against a panel supported on a die member or die button and the pilot portion pierces an opening in the panel and the panel is secured to the nut by the die member as disclosed, for example, in the above-referenced U.S. Pat. No. 3,089,360. Alternatively, the fastener may be utilized as a clinch nut, wherein an opening is preformed through the panel configured to receive the pilot portion and the panel is then secured to the fastener by the die button either by deforming the projecting end of the pilot portion or by deforming the panel into grooves in the pilot portion. As used herein, the term "self-attaching nut," includes both clinch and pierce nuts.

Various improvements to self-attaching nuts or female fasteners have been made by the predecessor in interest of the assignee of this application, primarily to improve the push-off strength or retention of the fastener to the panel as disclosed, for example, in U.S. Pat. Nos. 3,648,747 and 4,971,499. The self-attaching female fasteners disclosed in these patents include a central pilot portion having a planar top face, a threaded bore through the top face, flange portions on opposed sides of the pilot portion each having a planar bearing face as described above; however, the panel bearing faces each include a "re-entrant groove" which provides significantly improved push-off strength when installed in a metal panel. As used herein, the term "re-entrant groove" includes opposed inclined side walls and a bottom wall, wherein the inner side wall is inclined outwardly from the bottom wall toward the outer side wall and the outer side wall is inclined inwardly toward the inner side wall forming a restricted opening to the grooves, wherein the width of the grooves adjacent the panel bearing or support faces of the flange portions are less than the width of the grooves adjacent the bottom wall. As disclosed in these patents, the bottom wall is flat and parallel to the panel support faces of the flange portions.

The method of installing the self-attaching nuts disclosed in these patents includes supporting a panel on a die button having projecting clinching lips and the pilot portion is driven by a plunger through an opening in the panel. The projecting lips or "clinching lips" of the die button are driven against the panel, wherein the clinching lips deform panel portions adjacent the panel opening into the grooves and against the bottom wall. Where the self-attaching nut is used as a pierce nut, the pilot portion pierces a slug from the panel, forming the opening through the panel as described above. However, in this embodiment, the end faces of the clinching lips deform panel portions adjacent the panel opening against the bottom wall of the groove deforming the panel portions inwardly against and beneath the inclined inner side wall of the grooves and outwardly against and beneath the inclined outer side wall of the grooves forming a more secure installation having greater push-off strength.

In a typical application of a self-attaching nuts of the types described above, the self-attaching nuts are fed to an installation head having a reciprocal plunger generally attached to the upper die shoe of a die press and the die button is installed in the lower die shoe of the die press. A panel is received on the die button and, upon closing of the die press, the plunger is driven against a back or bottom face of a nut, which drives the nut through a plunger passage into the panel to install the self-attaching nut in the panel as described above. The panel may be simultaneously formed in the die press and the die press may include multiple installation heads and die buttons to simultaneously install a plurality of self-attaching nuts in the panel. Various means are utilized to feed the self-attaching nuts female fasteners to the installation head. For example, the self-attaching nuts may be fed to the installation head in bulk or the fasteners may be interconnected by frangible connector elements in a continuous strip of fasteners, wherein the plunger simultaneously shears a fastener located in the plunger passage from the fastener strip and installs the fastener in a panel as described in U.S. Pat. No. 3,845,860, also assigned to the predecessor in interest of the assignee of this application. In a preferred embodiment, the frangible connector elements are frangible wires, which may be formed of any suitable frangible material, which are installed in linear grooves in the bottom face of the fasteners on opposed sides of the fastener bore, preferably aligned with the fastener grooves as also disclosed in the above-referenced U.S. Pat. No. 4,971,499.

As will be understood by those skilled in this art, the self-attaching female fasteners described above may be formed in a rolling mill, wherein the desired cross-sectional shape of the self-attaching female fastener is rolled from a steel wire, the bores are punched or pierced through the pilot portion, the fasteners are cut to length and the bore is typically tapped or internally threaded. However, it is difficult to accurately roll the desired shape of the re-entrant groove because the fastener strip must be very accurately located relative to the forming rolls and it is presently not possible to balance the rolling forces in a conventional self-attaching nut configuration. Where the self-attaching fasteners are to be interconnected by frangible connector elements in a strip form, as described above, the wire grooves are rolled into the bottom face of the strip during roll forming of the fasteners and wires are then inserted into the grooves and secured.

As will also be understood by those skilled in this art, one limitation upon applications for self-attaching female fasteners of the type described is panel thickness. That is, the self-attaching female fasteners described above have a limited range of panel thicknesses which will provide a good installation. Further, although the self-attaching female fasteners having a re-entrant groove described above provide excellent push-off strength, further improvements can be made, particularly for heavy metal applications. It is also desirable to substantially completely fill the re-entrant grooves for improved retention.

Another problem associated with self-attaching nuts of the types described above results from the tapping of the nut bore. A female threaded bore is formed by piercing or punching an opening through the central pilot portion and then the bore is internally threaded with a conventional tapper, typically received through the top face of the pilot portion. As will be understood by those skilled in this art, the tapping operation results in burrs which extend from the threaded bore above the back or bottom face of the nut. As stated above, the self-attaching nut is then installed in a panel by driving a plunger against the bottom face of the nut, which drives the burrs back into the threaded bore of the nut sometimes interfering with the receipt of a male threaded fastener, such as a bolt, following installation of the self-attaching nut in a panel. This problem is presently solved by forming a countersink in the bore at the bottom face of the nut which removes the tapping burrs from the bottom face. The countersink is typically a frustoconical opening in the bore at the back face of the nut. As will be understood, however, this requires a separate operation which may slow the manufacturing line and thus adds additional cost to the self-attaching fastener.

There has thus been a long-felt need for a solution to the problem of tapping burrs being driven back into the threaded nut bore during installation by a plunger without adding cost to the self-attaching nut, such as by forming a countersink or counterbore in the threaded nut bore in the bottom face of the nut. The self-attaching nut of this invention eliminates this problem without substantial additional cost as now described.

SUMMARY OF THE INVENTION

As set forth above, this invention relates to self-attaching nuts for attachment to a panel, particularly including pierce and clinch nuts which, as described above, are attached to a panel by a plunger driven against the bottom face of the nut, driving the nut into a panel opening or piercing an opening in the panel and installed in the panel opening by a die button. The self-attaching nut for attachment to a panel of this invention includes a generally rectangular body portion including side faces, end faces, a top face and a bottom face. A central pilot portion projects from the top face of the body portion including a top face and a threaded bore extending through the top face of the pilot portion and the bottom face of the body portion. The self-attaching nut further includes flange portions on opposed sides of the pilot portion each having a top face and parallel grooves on opposed sides of the pilot portion. Thus, the self-attaching nut of this invention may be formed by rolling the cross-section of the nut, as described above, the nut section cut to length forming the end faces, a bore is formed through the pilot portion either before or after cutting the nut section to length and the bore is tapped as described above. Further, the self-attaching nut of this invention may be T-shaped, wherein the parallel grooves are preferably rolled into the side faces of the pilot portion adjacent the flange portions or the parallel grooves may be rolled into the top faces of the flange portions.

The self-attaching nut of this invention further includes parallel rails projecting from the bottom face of the body portion on opposed sides of the threaded bore having coplanar bottom faces, a recess between the rails and the threaded bore extends through the recess. Thus, upon installation of the self-attaching nut in a panel, the plunger is driven against the coplanar bottom faces of the rails which are spaced above the plane of the bottom face of the recess and thus the plunger does not engage the bottom surface of the self-attaching fastener surrounding the threaded bore and does not drive burrs back into the nut bore which would interfere with threaded receipt of a male threaded fastener, such as a bolt. Thus, the requirement for a countersink or counterbore in the bore in the bottom face of the nut is eliminated. Further, because the parallel rails extend parallel to the side faces of the nut body, the nut body may be easily rolled with the projecting parallel rails and therefore the self-attaching nut of this invention may be rolled without any substantial additional cost.

In one preferred embodiment of the self-attaching nut of this invention, the parallel projecting rails each have an inclined face extending from the coplanar bottom faces to a bottom face of the recess, such that the inner side faces of the rails are not deformed toward the threaded bore when the plunger is driven against the coplanar bottom faces. Further, in one preferred embodiment of the self-attaching nut of this invention, the rails are spaced from the threaded bore at least 0.020 inches or more preferably at least 0.030 inches. Where the self-attaching nuts of this invention are interconnected by frangible wires, as described above, the coplanar bottom faces of the rails preferably include parallel grooves, most preferably located generally at the center or midportion of the coplanar bottom faces, extending parallel to the parallel projecting rails. In this embodiment, the parallel grooves in the bottom faces of the rails each include a frangible wire interconnecting adjacent self-attaching nuts. Because the rails are rolled with the body portion, the rails extend across the entire length of the bottom faces of the body portion between the end faces.

As will be understood, various modifications may be made to the self-attaching nut of this invention as discussed further below within the purview of the appended claims. Other advantages and meritorious features of the self-attaching nut of this invention will be more fully understood from the following description of the preferred embodiment, the appended claims and the drawings, a brief description of which follows. However, as will be understood by those skilled in this art, the embodiment of the self-attaching nut of this invention disclosed in the drawings and described below are for illustrative purposes only and do not limit this invention.

DESCRIPTION OF A PREFERRED EMBODIMENTS

As set forth above, the self-attaching nut of this invention may be utilized either as a pierce or clinch nut, wherein the nut is permanently installed in a panel in a die press or the like for attachment of a second member to the panel by threading a male fastener, such as a bolt, into the bore of the self-attaching nut to secure the second member to the panel as further described in the above-referenced patents. In a preferred embodiment of the self-attaching nut of this invention, the desired configuration of the self-attaching nut is first rolled into the desired cross-section of the nut, sometimes referred to as the nut blank or rolled nut section 20 shown in FIG. 1. However, as set forth above, this invention is not limited to the configuration of the self-attaching nut.

Figure 1:
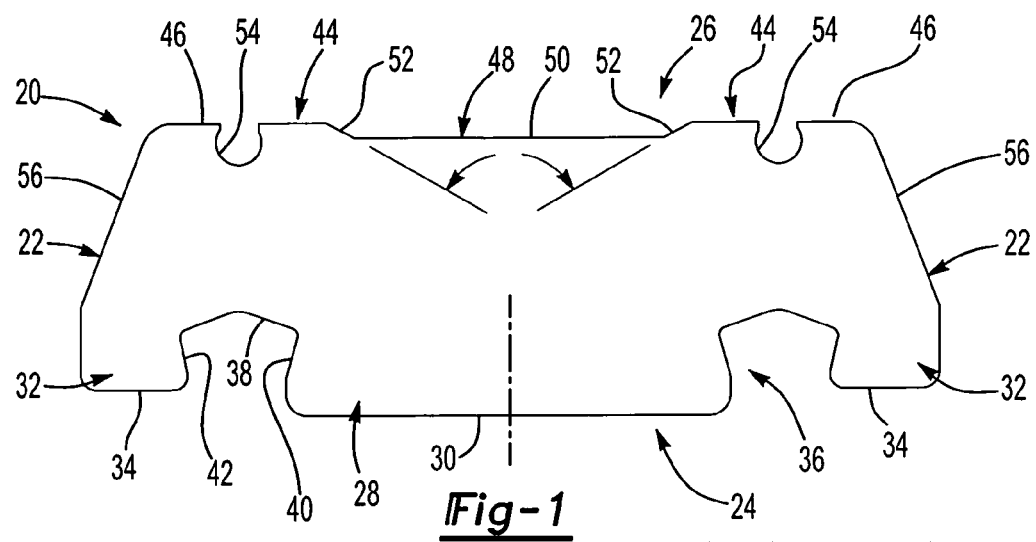
FIG. 1 is an end view of a rolled nut blank used to manufacture one embodiment of the self-attaching nut of this invention.

The nut blank or rolled nut section 20 shown in FIG. 1 includes side faces 22, a top face 24, and a bottom face 26. As will be understood, the terms "side," "top," "bottom," and "end" are arbitrary terms for descriptive purposes only. The disclosed embodiment of the rolled nut section 20 includes a central pilot portion 28 in the top face 24 of the rolled nut section having a planar top face 30, flange portions 32 on opposed sides of the pilot portion 28 each having a top face 34 and parallel grooves 36 in the top faces 34 of the flange portions 32 adjacent the pilot portion 28. In the disclosed embodiment of the rolled nut section 20, the parallel grooves 36 include a V-shaped bottom wall 38, an inclined inner side wall 40, and an inclined outer side wall 42. As set forth in more detail in the above-referenced co-pending patent application, this configuration of a "re-entrant groove" results in several important advantages, including a more accurate cross-section because the V-shaped bottom wall 38 centers the rolling forces and the V-shaped bottom wall centers the wire grooves (described below) during rolling, resulting in more accurate location of the wire grooves. Further, because the re-entrant grooves are deeper than conventional re-entrant grooves having a flat bottom wall, the panel portions deformed into the grooves are better packed into the grooves with less thinning of the panel metal, resulting in a more secure installation than conventional self-attaching nuts of this type.

In the preferred embodiment of this invention, the bottom face 26 of the rolled nut section 20 includes parallel rails 44 projecting from the bottom face 26 having coplanar bottom faces 46. As described above, the parallel rails 44 eliminate the requirement for a countersink or counterbore in the nut bore at the bottom face 26 of the nut. In a preferred embodiment, a recess 48 is provided between the parallel rails 44 which, in the disclosed embodiment, has a planar bottom face 50. As described further below, the nut bore is formed through the bottom face 50 of the recess 48. In a preferred embodiment, the bottom face 26 of the rolled nut section 20 further includes inclined surfaces 52 extending inwardly from the coplanar bottom faces 46 of the parallel rails 44 to the bottom face 50 of the recess. As described above, the self-attaching nuts of this invention may be fed to an installation head in bulk form or the self-attaching nuts may be interconnected by frangible wires. Where the nuts are interconnected by frangible wires, parallel grooves 54 are preferably rolled into the coplanar bottom faces 46 of the parallel rails 44 which, because the nut blank 20 is rolled, are parallel to the parallel rails 44 and are preferably located generally midway between the side faces of the parallel rails which, in the disclosed embodiment, is midway between the inclined surfaces 52 and the side faces 22. In the disclosed embodiment, the side faces 22 include inclined side faces 56 to reduce the weight of the self-attaching nut and therefore the cost.

Figure 2:
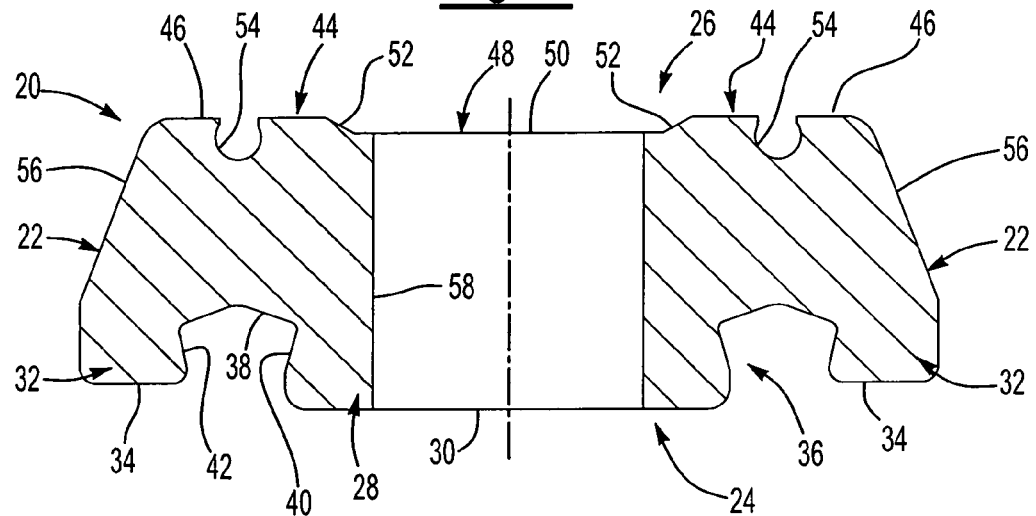
FIG. 2 is an end cross-sectional view of the nut blank shown in FIG. 1 following piercing of the nut bore.
Figure 3:
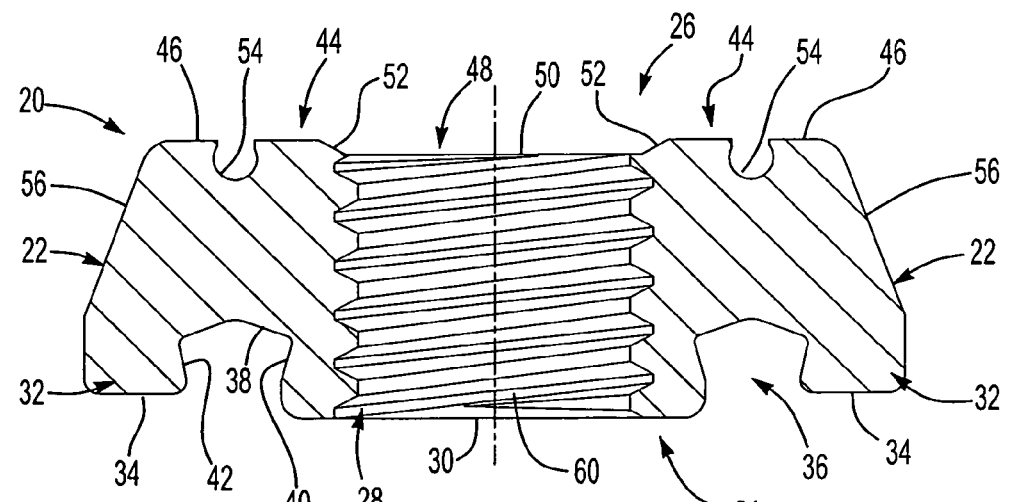
FIG. 3 is an end cross-sectional view of FIG. 2 following tapping.
Figure 4:
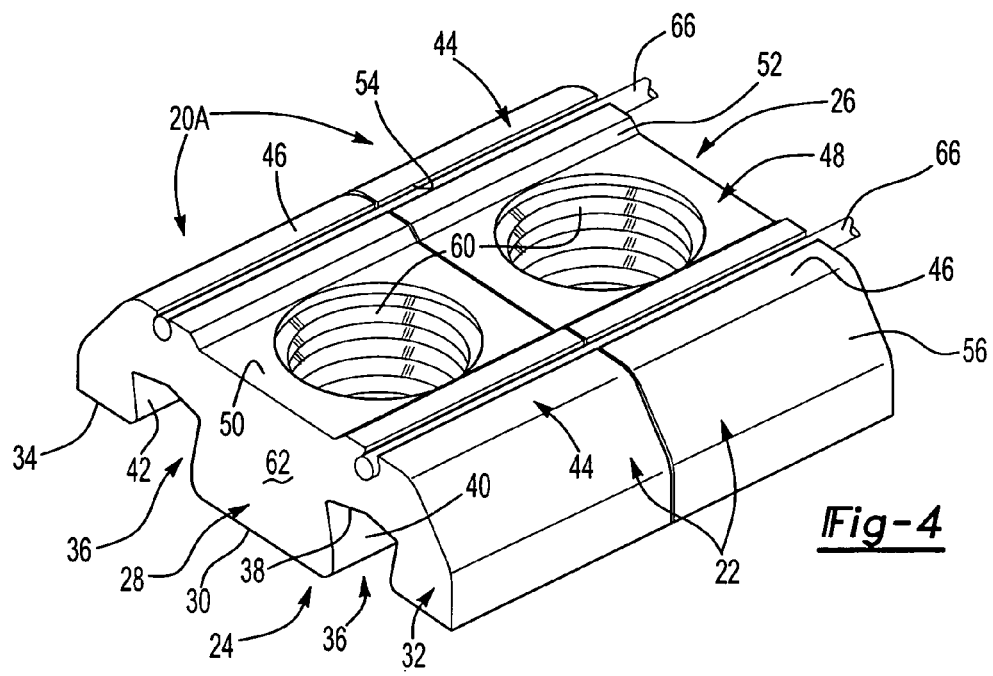
FIG. 4 is a perspective view of one embodiment of the self-attaching nut shown in FIG. 3 interconnected by frangible wires.

Following rolling of the nut blank or the rolled nut section 20, a bore 58 is pierced or punched through the top face 30 of the central pilot portion 28 and through the channel-shaped recess 48 in the bottom face 26 of the rolled nut section 20 as shown in FIG. 2. The smooth bore 58 is then internally threaded or tapped as shown at 60 in FIG. 3. A self-attaching nut 20A is then cut or chopped from the rolled nut section 20 having end faces 62 as shown in FIG. 4. The nut bore 58 (FIG. 2) may be tapped as shown at 60 in FIG. 3 before or after the self-attaching nuts 20A are cut or chopped from the rolled nut section 20. As set forth above, the self-attaching nuts 20A may be fed individually or in bulk to an installation head (not shown) typically located in the upper die platen of a press having a reciprocating plunger, as shown at 64 in FIG. 5, or the self-attaching nuts 20A may be interconnected by frangible wires 66 as shown in FIG. 4. The frangible wires 66 are received in the parallel grooves 54 preferably in the bottom face 26 of the self-attaching nut 20A and most preferably in the parallel rails 44 as shown in the figures and described above.

Figure 5:
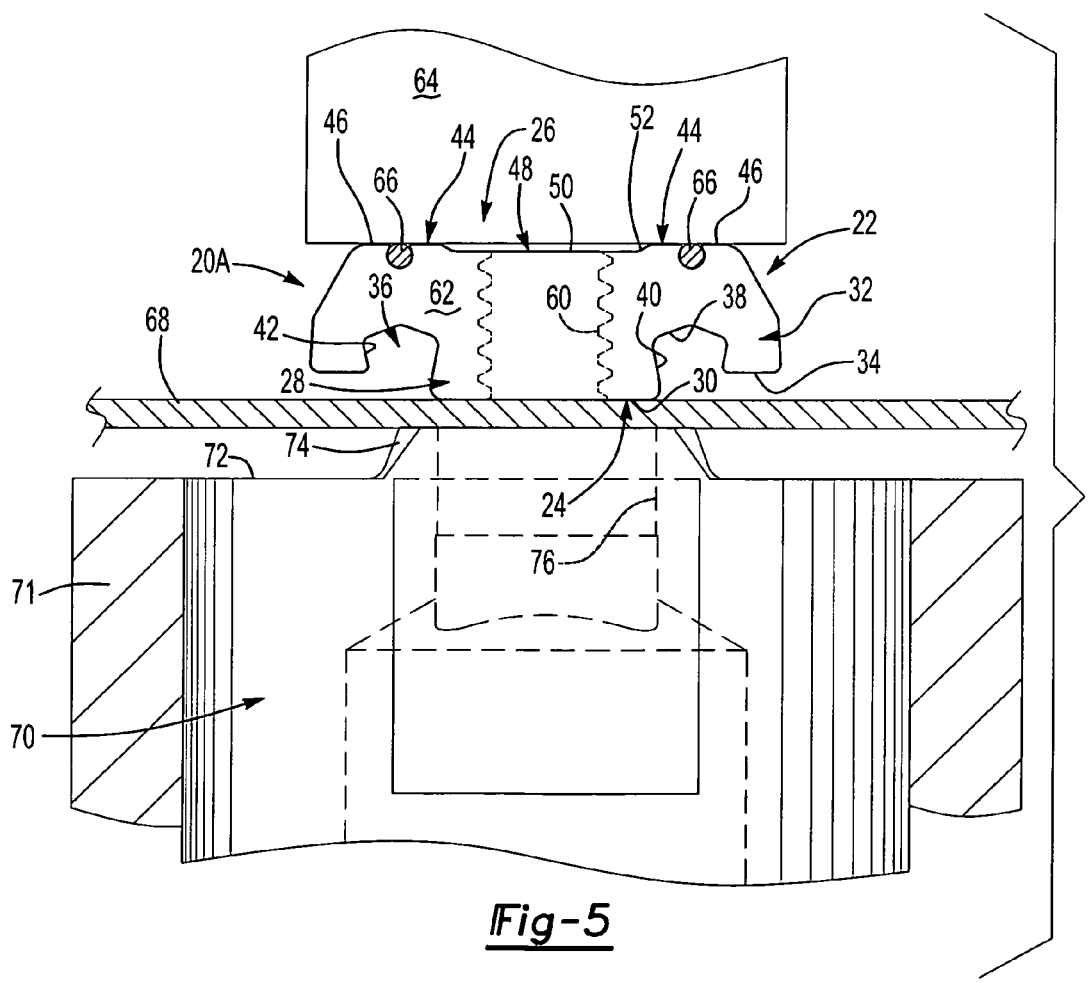
FIG. 5 is a side cross-sectional view of the embodiment of the self-attaching nut shown in FIGS. 3 and 4 during installation in a panel.

As described above and known by those skilled in this art, a self-attaching nut of the type shown at 20A in FIG. 5 is installed in a panel 68 by a reciprocating plunger 64 of an installation head (not shown) typically installed in the upper die shoe or platen of a die press (not shown). The reciprocating plunger 64 is driven against the bottom face 26 of the self-attaching nut 20A and the panel 68 is supported on a die member or die button 70 typically located in the lower die shoe or die platen 71 of a press. The die button 70 typically includes an end face 72 and clinching lips 74 aligned with the parallel grooves 36 of the self-attaching nut 20A and a rectangular opening 76 configured to receive a slug pierced from the panel 68 as the top face 30 of the pilot portion 28 is driven against the panel 68 by the plunger 64. Alternatively, an opening in the panel may be preformed and the pilot portion 28 of the self-attaching nut 20A is then received through the preformed panel opening and installed as a clinch nut. As will also be understood by those skilled in this art, the clinching lips 74 drive a portion of the panel adjacent the panel opening (not shown) into the parallel grooves 36 in the top face 24 of the nut against the V-shaped bottom wall 38 and beneath the inclined inner and outer side walls 40 and 42, respectively, of the parallel grooves 36, permanently attaching the self-attaching nut 20A to the panel 68.

As shown in FIG. 5, the plunger 64 is driven against the coplanar bottom faces 46 of the parallel rails 44, which are spaced above (in FIG. 5) the bottom wall 50 of the channel-shaped recess 48 through which the threaded bore 60 is received. Thus, tapping burrs (not shown) which extend from the bore 60 through the bottom face 50 of the channel-shaped recess 48 are not driven back into the threaded bore 60 to interfere with the threaded receipt of a male fastener, such as a bolt. Thus, the self-attaching fastener of this invention eliminates the requirement for a countersink or counterbore in the threaded bore 60 at the bottom face 26 of the self-attaching nut, thus reducing the cost of the nut. Further, because the parallel rails 44 are formed during the rolling process of the rolled nut section 20 as shown in FIG. 1, the parallel rails do not add any substantial additional costs. Finally, as will be understood by those skilled in this art, the self-attaching nuts 20A may be stacked in the pierce nut installation head (not shown), wherein the parallel rails 44 provide additional advantages in assuring that the self-attaching nuts are properly stacked and prevent burrs from being driven back into the threaded bore 60. The preferred dimensions of the bottom face 26 of the self-attaching nut 20A will, to some extent, depend upon the application including the size of the nut. However, in a preferred embodiment, the depth of the channel-shaped recess 48 is preferably at least 0.005 inches, preferably between 0.005 to 0.020 inches to accommodate tapping burrs or chips which normally extend from the bottom face 50. As set forth above, in a preferred embodiment of the self-attaching nut 20A, inwardly inclined surfaces 52 are provided between the coplanar bottom faces 46 and the bottom face 50 of the channel-shaped recess 48 to prevent deformation of the coplanar bottom faces 46 during installation in a panel 68 as described above. In one preferred embodiment, the angle is approximately 20 degrees to 40 degrees or more preferably about 30 degrees. Finally, the parallel rails 44 are preferably spaced from the threaded bore 60 at least 0.020 inches or more preferably at least 0.030 inches.

As will be understood by those skilled in this art, various modifications may be made to the self-attaching nut of this invention within the purview of the appended claims. For example, as described above, the self-attaching nut of this invention may be T-shaped as described in the above-referenced patents assigned to the predecessor in interest of the assignee of this Application, wherein the flange portions are located adjacent the bottom face of the nut and the parallel grooves are defined in the side faces of the pilot portion. The improvement provided by the parallel rails 44 and the channel-shaped recess 48 between the parallel rails 44 may be utilized with any self-attaching nut. Further, as described above, the self-attaching nuts of this invention may be fed to an installation head having a reciprocating plunger 64 in bulk form, eliminating the requirement for the parallel grooves 54 and the frangible wires 66. Having described a preferred embodiment of the self-attaching nut of this invention, the invention is now claimed as follows.

The invention claimed is:

1. A self-attaching nut for attachment to a panel, comprising:
    a body portion including side faces, end faces, a top face and a bottom face;
    a central pilot portion projecting from said top face of said body portion including a top face of said central pilot portion and a threaded bore extending through said top face of said pilot portion and through said bottom face of said body portion;
    flange portions on opposed sides of said central pilot portion, each of said flange portions having a top face;
    parallel grooves on opposed sides of said pilot portion; and
    said bottom face of said body portion including parallel projecting rails extending between opposed sides of said threaded bore and said parallel grooves and having coplanar bottom faces, a recess between said rails, and said threaded bore extending through said recess.

2. The self-attaching nut as defined in claim 1, wherein said recess has a planar bottom face.

3. The self-attaching nut as defined in claim 1, wherein said parallel projecting rails each have an inclined face extending from said co-planar bottom faces to a bottom face of said recess.

4. The self-attaching nut as defined in claim 1, wherein said rails are spaced from said threaded bore at least 0.020 inches.

5. The self-attaching nut as defined in claim 1, wherein said rails are spaced from said threaded bore at least 0.030 inches.

6. The self-attaching nut as defined in claim 1, wherein said co-planar bottom faces of said rails include parallel grooves extending parallel to said rails spaced from said side faces of said body portion.

7. The self-attaching nut as defined in claim 6, wherein said parallel grooves in said bottom faces of said rails each include a frangible wire interconnecting adjacent self-attaching nuts.

8. The self-attaching nut as defined in claim 1, wherein said parallel grooves on opposed sides of said pilot portion are in said top face of said flange portions adjacent said pilot portion.

9. The self-attaching nut as defined in claim 1, wherein said recess has a depth of between 0.005 to 0.020 measured between said co-planar bottom faces of said rails and a bottom face of said recess.

10. The self-attaching nut as defined in claim 1, wherein said coplanar bottom faces of said rails extend from generally adjacent said recess to said side faces of said body portion.

11. The self-attaching nut as defined in claim 1, wherein said coplanar bottom faces of said rails extend a full length of said bottom face of said body portion between said end faces.

12. A rolled self-attaching nut for installation in a panel by a plunger, comprising:
    a generally rectangular body portion including parallel side faces, end faces, a top face and a bottom face;
    a central pilot portion projecting from said top face of said body portion, including a planar top face of said central pilot portion and a threaded bore extending through said top face of said central pilot portion and said bottom face of said body portion;
    parallel flange portions on opposed sides of said central pilot portion, each having a rectangular top face; and
    said bottom face of said body portion including parallel projecting rails on opposed sides of said threaded bore having coplanar bottom faces spaced from said threaded bore, a channeled recess between said rails and said threaded bore extending through said recess, wherein a plunger is driven against said coplanar bottom faces of said rails during installation of said self-attaching nut in a panel.

13. The rolled self-attaching nut as defined in claim 12, wherein said coplanar bottom faces of said rails extend a full length of said bottom face of said body portion between said end faces.

14. The rolled self-attaching nut as defined in claim 12, wherein said parallel projecting rails each include an inclined face extending inwardly from said coplanar bottom faces to a bottom face of said recess.

15. The rolled metal self-attaching nut as defined in claim 12, wherein said rails are spaced from said threaded bore at least 0.020 inches.

16. The rolled metal self-attaching nut as defined in claim 12, wherein said coplanar bottom faces of said rails each include parallel grooves extending parallel to said rails generally in a midportion of said rails.

17. The rolled metal self-attaching nut as defined in claim 16, wherein said parallel grooves in said bottom faces of said rails each include a frangible wire interconnecting adjacent self-attaching nuts.

18. A self-attaching nut for attachment to a panel, comprising:
    a generally rectangular body portion including parallel side faces, end faces, a top face and a bottom face;
    a central pilot portion projecting from said top face of said body portion including a planar rectangular top face of said central pilot portion and a threaded bore extending through said top face of said pilot portion and said bottom face of said body portion;

flange portions on opposed sides of said pilot portion each having a top face; and said bottom face of said body portion including parallel projecting rails on opposed sides of said threaded bore spaced from said threaded bore having coplanar bottom faces, a recess between said rails having a bottom face with said threaded bore extending through said bottom face of said recess, and said top face of said pilot portion and said coplanar bottom faces of said rails each including a groove extending parallel to said parallel projecting rails.

19. The self-attaching nut as defined in claim 18, wherein each of said parallel grooves in said co-planar bottom faces of said rails include a frangible wire interconnecting adjacent self-attaching nuts.

20. The self-attaching nut as defined in claim 18, wherein said parallel projecting rails each have an inclined face extending inwardly from said coplanar bottom faces of said rails to said bottom face of said recess.

* * * * *